UNITED STATES PATENT OFFICE.

WM. D. HALL, OF HAMDEN, CONNECTICUT, ASSIGNOR TO QUINNIPIAC COMPANY, OF SAME PLACE.

IMPROVED MANURE.

Specification forming part of Letters Patent No. 46,847, dated March 14, 1865.

*To all whom it may concern:*

Be it known that I, WILLIAM D. HALL, of the town of Hamden, in the county of New Haven and State of Connecticut, have invented a new and useful Improvement in Preparing Concentrated Artificial Manure; and I do hereby declare that the following is a full, clear, and exact description of the construction, character, and operation of the same.

My improvement consists in preparing concentrated artificial manure from the refuse of lobsters by drying and pulverizing.

I take the shells, claws, and indeed any and every part of the lobster which has heretofore been thrown away as refuse, and even whole lobsters which have become tainted or otherwise unfit for food, and dry them by artificial heat, or, when the weather is dry and warm, natural heat may be used alone, if sufficient, or in connection with artificial heat, until I have produced complete desiccation. I then grind or otherwise pulverize the mass to a suitable degree of fineness for use in the same manner and to about the same degree of fineness as I do my fish-manure, for which I obtained a patent dated December 20, 1859, or as guano is ground or pulverized for use, so that it may be conveniently sown or deposited on the land. When it is thus prepared it is capable of being preserved for any indefinite period of time, and may be put up in casks, boxes, &c., for transportation, &c., the same as guano or fish-manure.

This manure is believed to be (by weight) of nearly, if not quite, the value of my fish-manure, to which I have above referred, and may be prepared at much less expense, as the lobster-refuse costs but a trifle. Indeed the custom has been, on the southerly coast of the State of Maine especially, where large quantities of lobsters are used or cooked and put up for use, to carry the refuse by the boat-load to a distance from the land and shovel it overboard, merely to get rid of it, to prevent it from becoming a nuisance; and the expense of preparing the manure is less than that of preparing the fish-manure, as no acids or other chemicals are necessary, neither is boiling or roasting necessary in the preparation, though where whole lobsters are used acid might be used to assist and expedite the process of desiccation, if thought best at any time; but it is not deemed necessary even then.

What I claim as my invention or discovery, and desire to secure by Letters Patent, is—

Preparing concentrated artificial manure from lobster-refuse by desiccation and pulverization, substantially as herein described.

WM. D. HALL.

Witnesses:
R. FITZGERALD,
H. A. KEATING.